Sept. 21, 1943.    LE ROY F. MAURER    2,329,724
TRANSMISSION
Filed Dec. 7, 1937    8 Sheets-Sheet 1

Inventor
Le Roy F. Maurer
By Nathaniel Frucht
Attorney

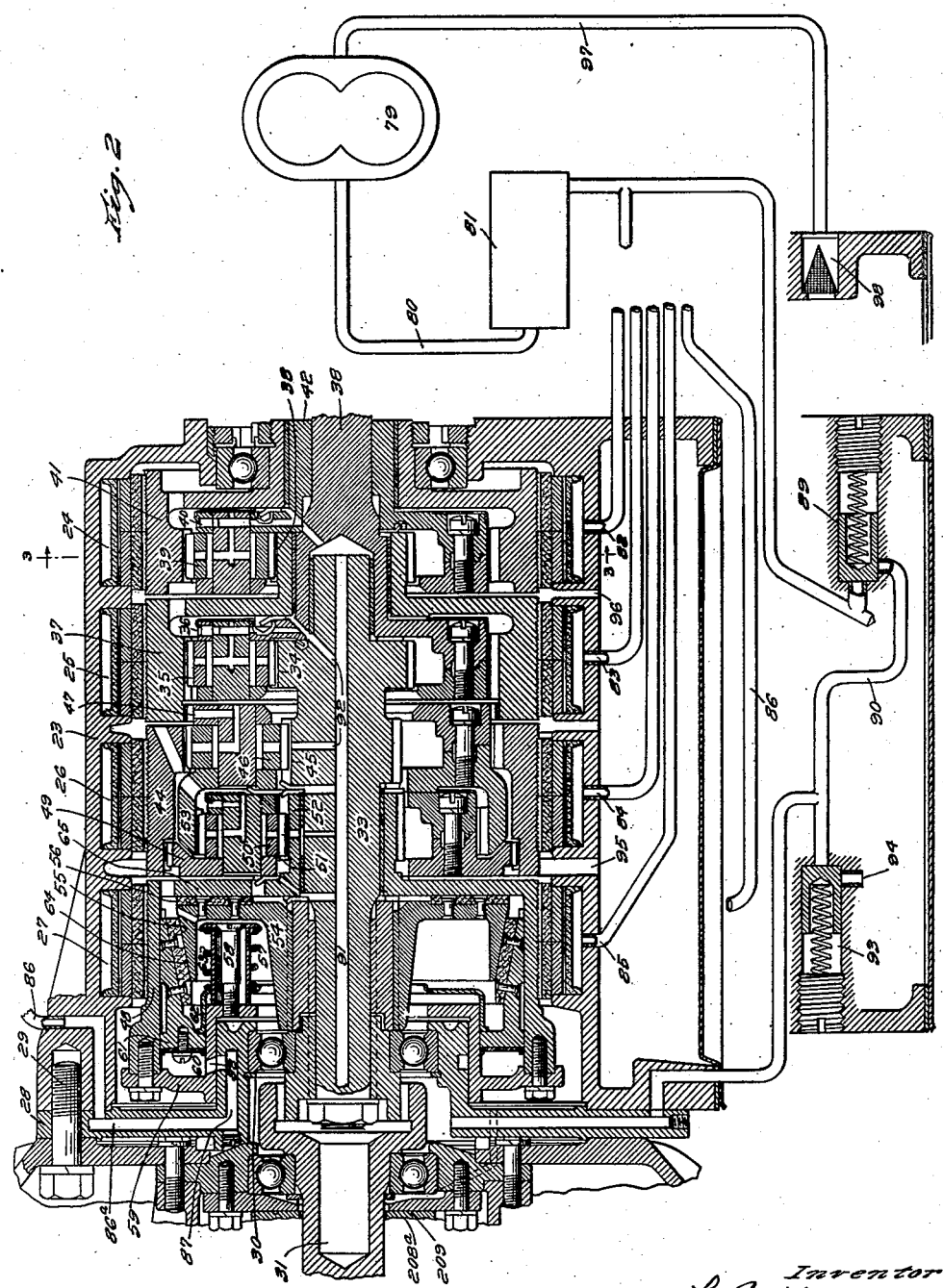

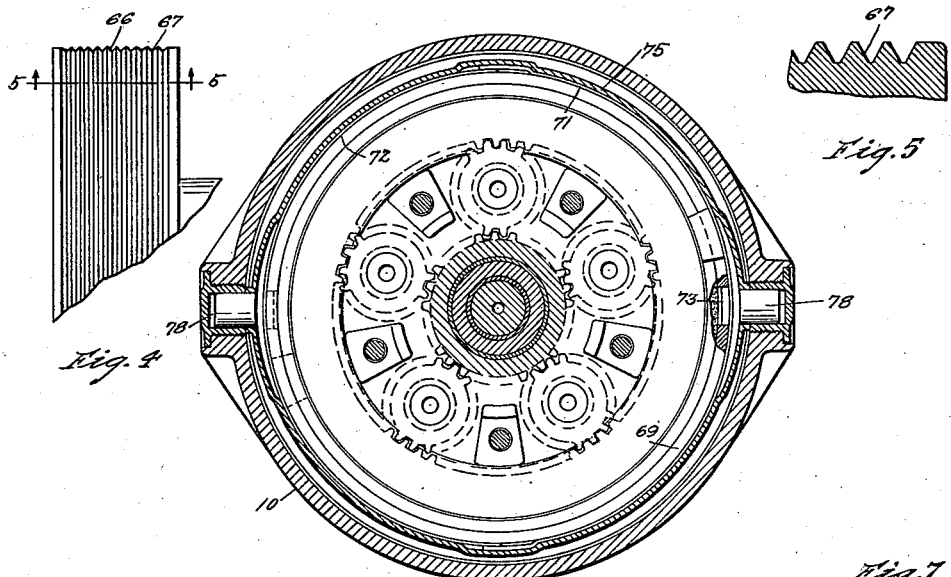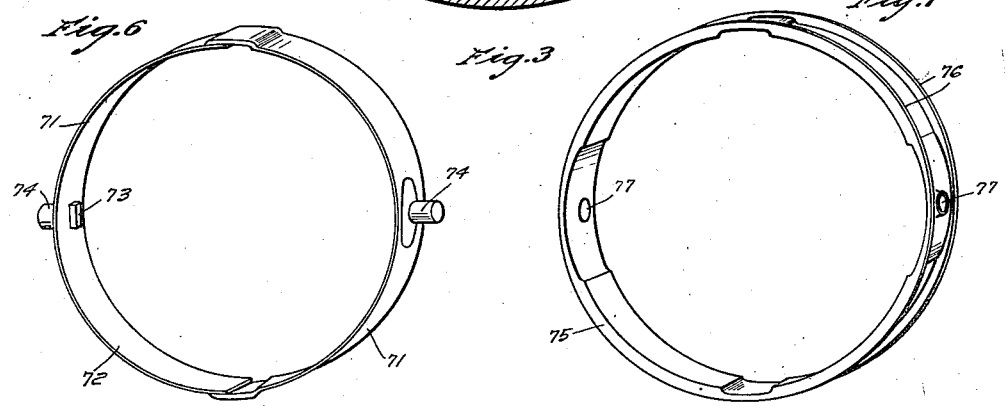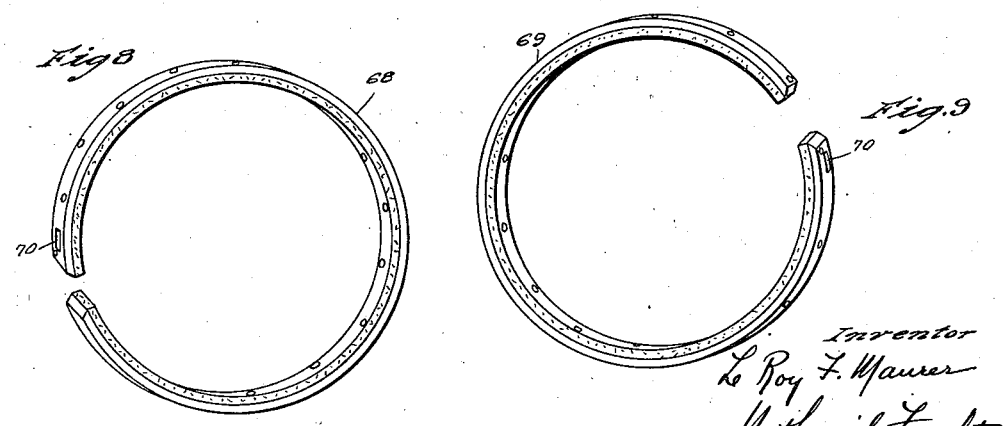

Sept. 21, 1943.    LE ROY F. MAURER    2,329,724
TRANSMISSION
Filed Dec. 7, 1937    8 Sheets-Sheet 4
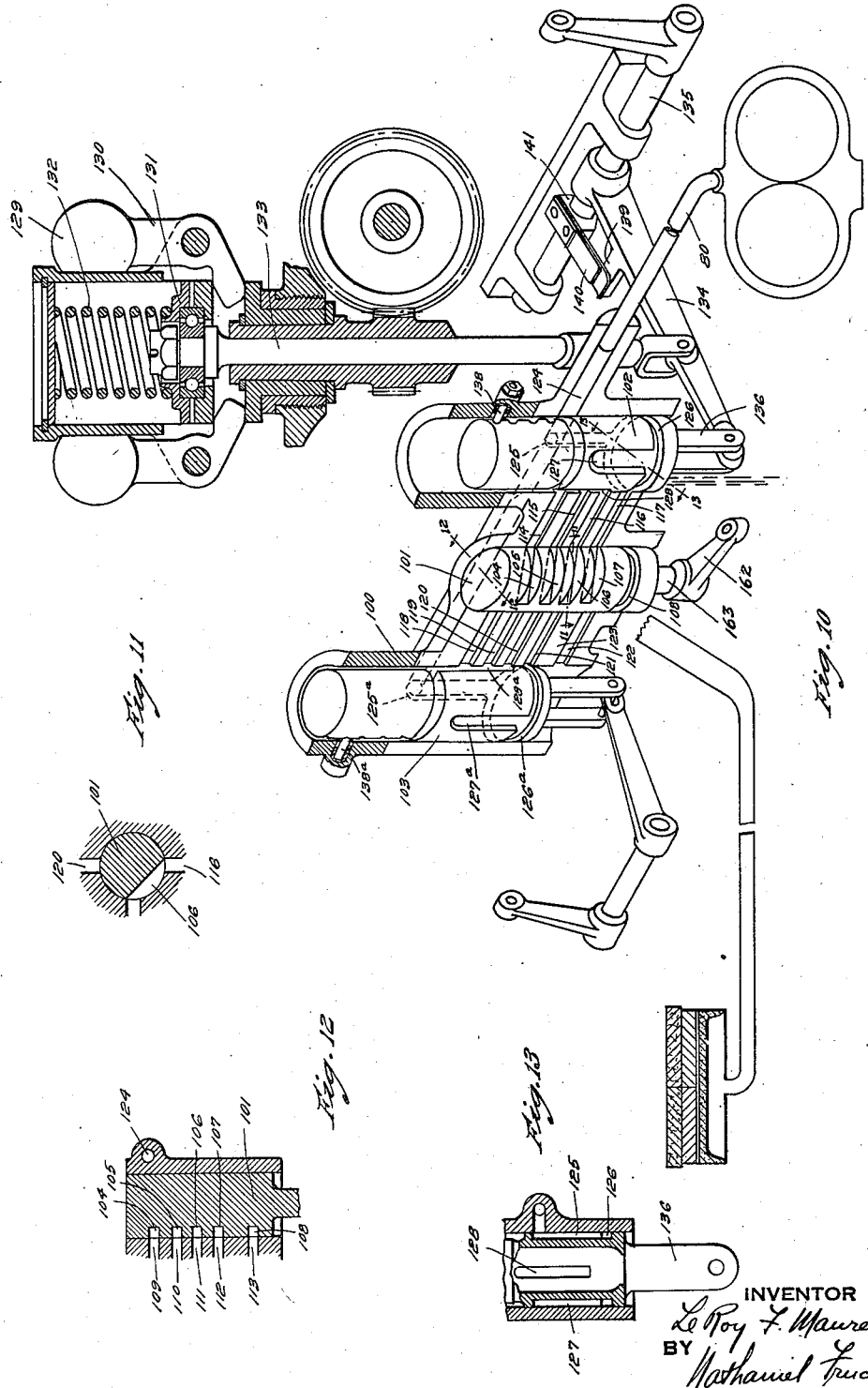
INVENTOR
Le Roy F. Maurer
BY Nathaniel Frucht
ATTORNEY

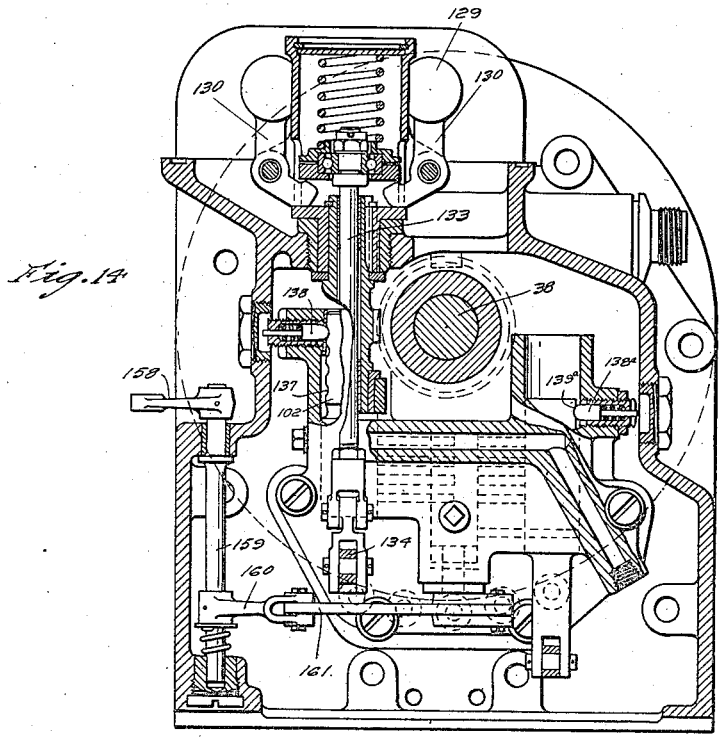

Sept. 21, 1943. LE ROY F. MAURER 2,329,724
TRANSMISSION
Filed Dec. 7, 1937 8 Sheets-Sheet 7
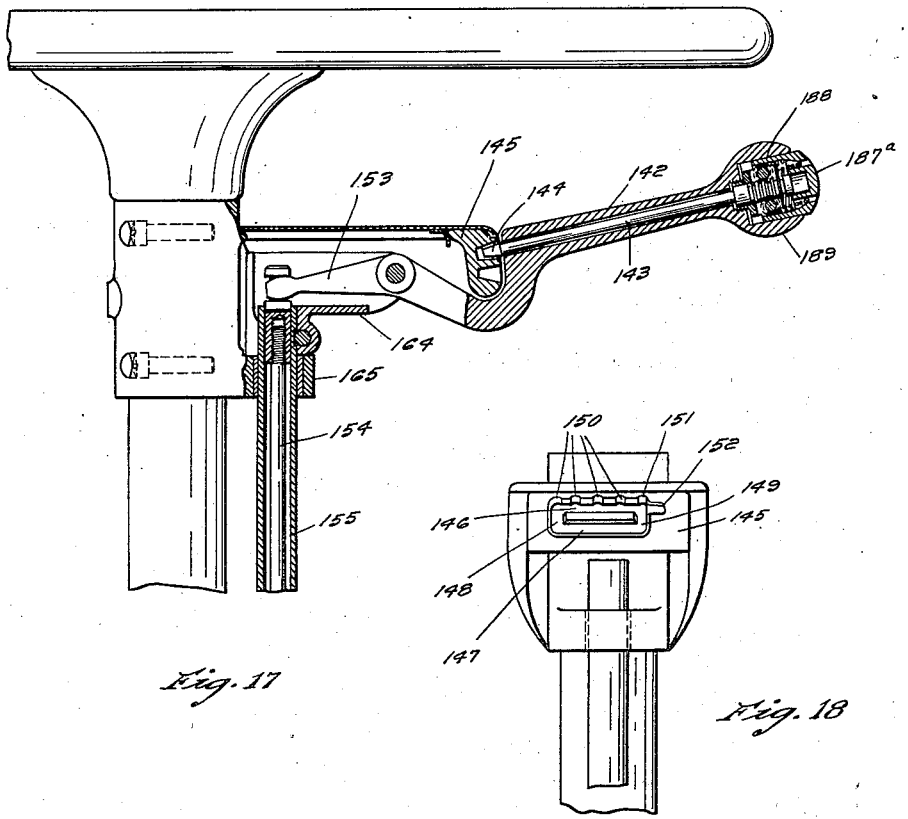
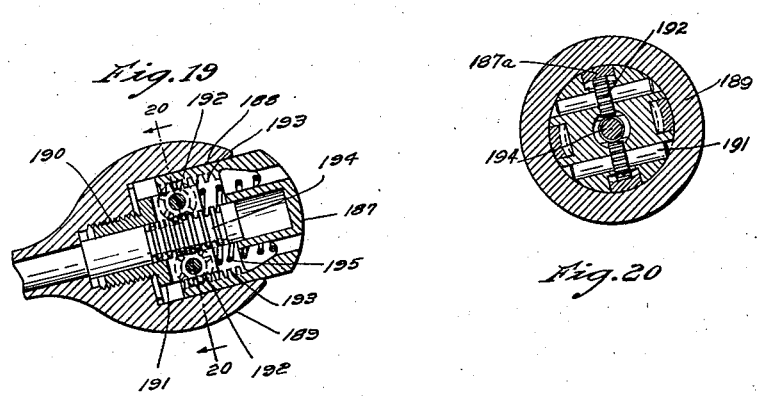
INVENTOR
Le Roy F. Maurer
BY Nathaniel Frucht
ATTORNEY

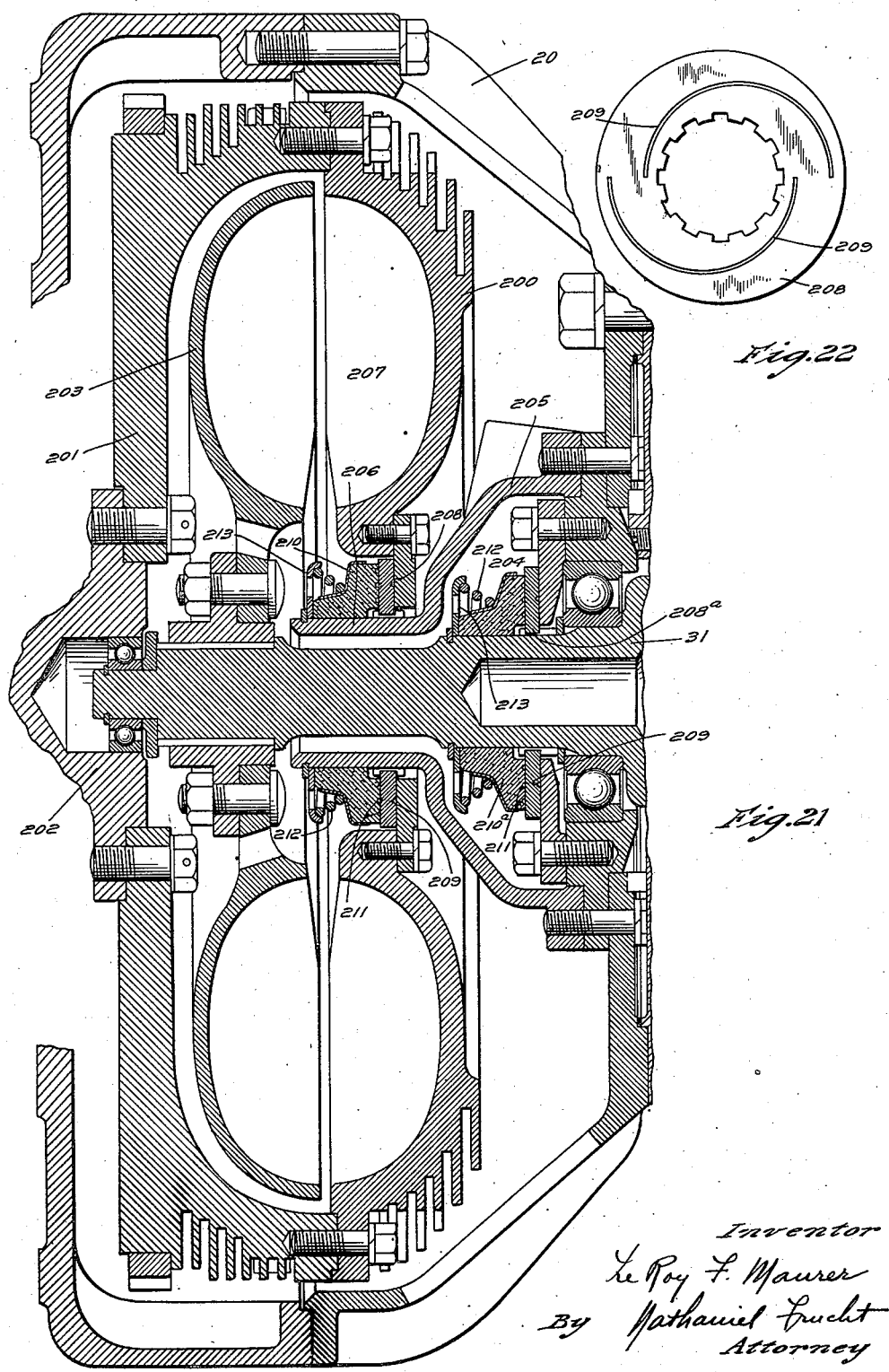

Patented Sept. 21, 1943

2,329,724

UNITED STATES PATENT OFFICE 2,329,724

TRANSMISSION

Le Roy F. Maurer, Kenmore, N. Y., assignor to Automatic Turbine Drive Company, Inc., a corporation of New York Application December 7, 1937, Serial No. 178,447

8 Claims. (Cl. 137—144)

My present invention relates to the automotive art, and has particular reference to the mechanism for transmitting power from the motor to the output or tail shaft.

It is the principal object of my invention to provide an automatic transmission which will function smoothly to shift from one speed to another, in accord with changes in the car speed.

It is a further object of my invention to provide means for changing from automatic control to full hand control, and to lock the transmission in any desired speed or ratio, at the will of the operator.

Another object is to provide suitable mechanism for transmitting torque from the motor to the transmission in a manner to minimize shock from the impact on the pistons and to obtain maximum flexibility and smoothness of operation.

An additional object of my invention is to provide a transmission which does not require a conventional type clutch, whereby the driver need only operate an accelerator pedal and a brake pedal, thus eliminating need for shifting the foot from the accelerator to the brake pedals and increasing the feature of safety in emergency stops.

A further object of my invention is to provide an automatic control for shifting to a lower gear ratio, at any speed, in order to obtain rapid acceleration for passing other vehicles or for increasing the power when climbing hills.

Another object of my invention is to provide four speeds forward, and reverse, in order to use relatively high rear axle gear ratios, whereby less wear and tear, increased fuel economy, and reduced oil consumption results.

Still another object is to obtain the above results with a minimum number of working parts, functioning in as simple a manner as possible, whereby the cost of production and the upkeep are low.

With the above and other objects and advantageous features in view, my invention consists of a novel arrangement of parts more fully disclosed in the detailed description following, in conjunction with the accompanying drawings, and more specifically defined in the claims appended thereto.

In the drawings,

Fig. 2 is a vertical sectional view of Fig. 1 parts being broken away;

Fig. 3 is a sectional view on the line 3—3 of Fig. 2;

Fig. 4 is an enlarged detailed view, partially broken away, of one annulus;

Fig. 5 is a section on the line 5—5 of Fig. 4;

Fig. 6 is a perspective view of the semi-circular brake straps;

Fig. 7 is a perspective view of the flexible compressible sealing ring;

Figs. 8 and 9 are perspective views of the brake bands;

Fig. 10 is a perspective view partly in section showing the governor and valve controls;

Fig. 11 is a section taken on line 11—11 on Fig. 10;

Fig. 12 is a sectional perspective view, parts being broken away, showing the pressure fluid flow control mechanism;

Fig. 13 is a sectional view on the line 13—13 of Fig. 10;

Fig. 14 is a sectional view on the line 14—14 of Fig. 1;

Fig. 15 is a sectional view on the line 15—15 of Fig. 1;

Fig. 17 is an enlarged sectional view of the steering column parts;

Fig. 18 is a detail side view of the hand lever housing;

Fig. 19 is an enlarged sectional view of the hand lever button;

Fig. 20 is a section on the line 20—20 of Fig. 19;

Fig. 21 is a section through the fluid transmitter; and

Fig. 22 is a plan of the novel sealing ring.

Figure 1:
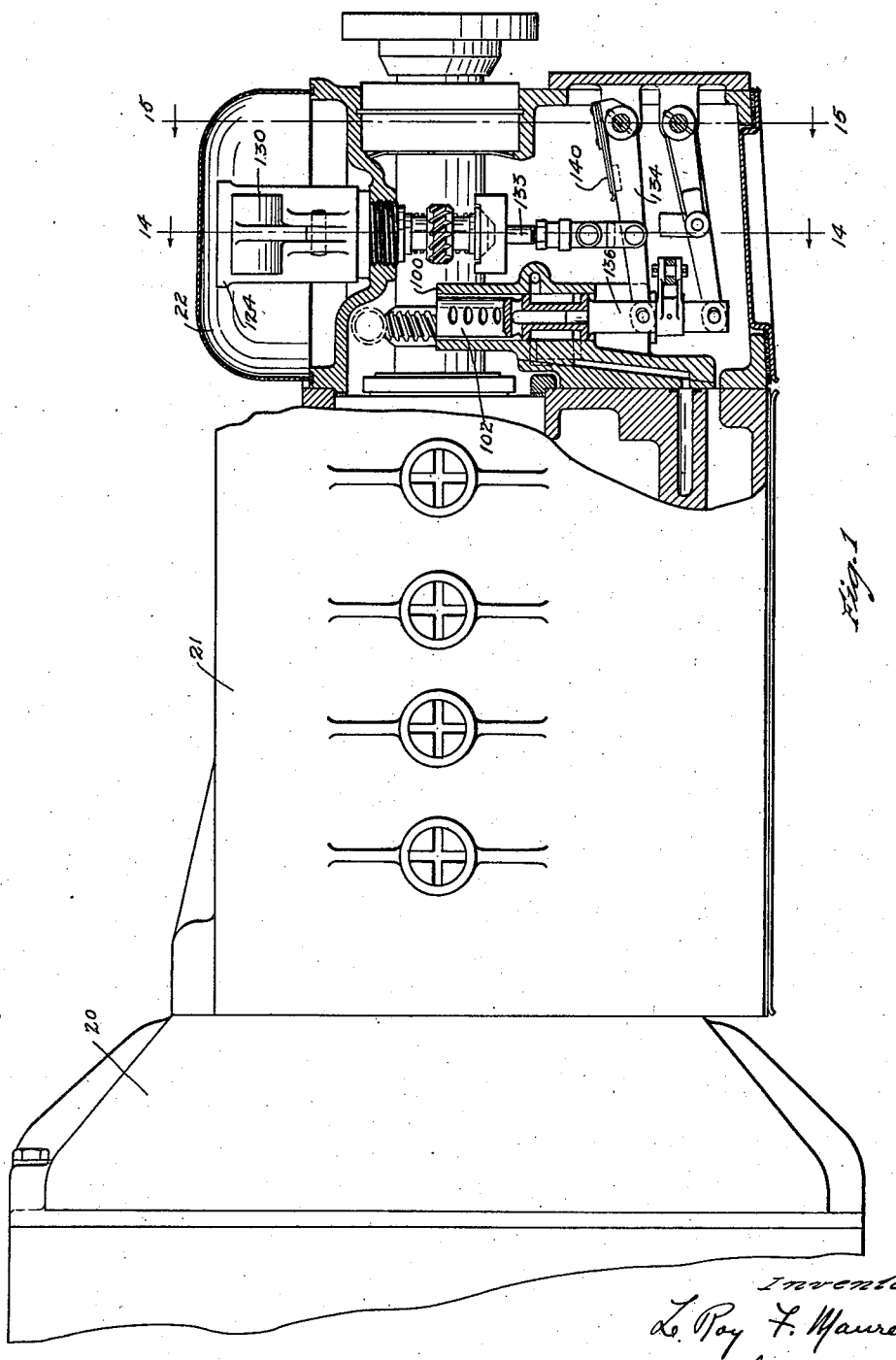
Fig. 1 is a side elevation of the power transmitting mechanism, parts being broken away.
Figure 16:
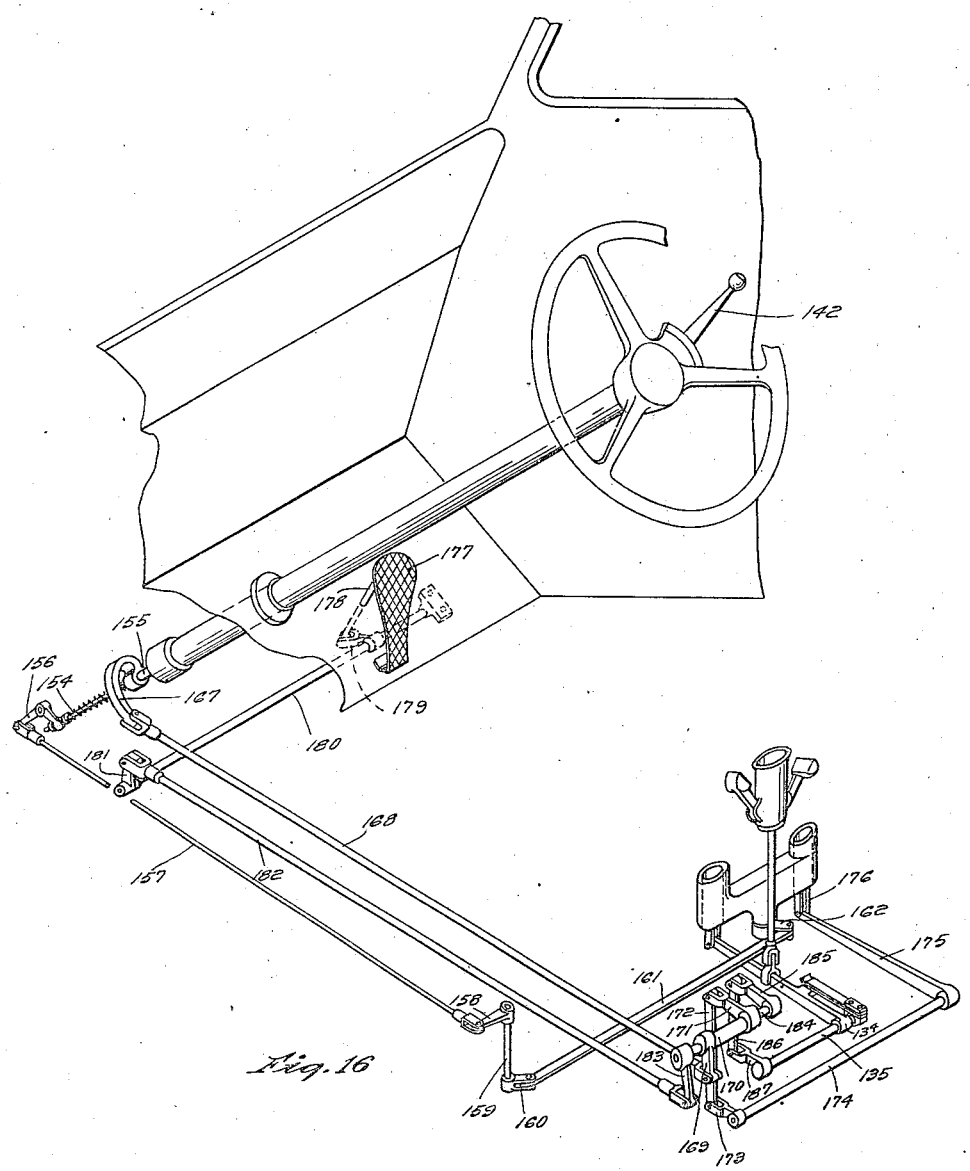
Fig. 16 is a perspective detail showing the lever assembly for the flow control mechanism.

It has been found desirable to provide an automatic transmission for performing gear shifting smoothly and with the least possible attention of the operator, to effect a change of speed at certain definite car speeds, and at motor speeds where the motor attains maximum torque. This shifting from one speed to another should be under load, so that no loss in acceleration occurs, and should be automatic and without necessity for the operator to exercise any thought as to what is taking place.

Moreover, when the transmission has automatically shifted into top gear, the operator should, at any point under the maximum motor speed for the next lower gear reduction, be permitted to make the transmission shift down to the next lower gear ratio, in order to have rapid acceleration for passing other vehicles, or for making the necessary power available for climbing grades without waiting for the drop in car speed which would make the controlling mechanism function. The transmission should also automatically shift downward to the low gear starting position when the vehicle comes to a stop, so as to again be in position for the most efficient acceleration.

It is also desirable to provide a manual control, for driving in hilly or mountainous sections of the country, so as to lock the transmission in any desired speed or ratio, thus permitting use of the motor as a brake to help control the vehicle in descending grades; this control can also be used to lock any gear in order to give the correct ratio for the various grades and thus facilitate the making of maximum time. The use of a manual control changing from automatic to full hand control at the will of the operator makes any speed or gear reduction available at any time, thus providing a transmission that meets all driving requirements.

I have therefore devised a transmission which will meet the needs of the driving public, and I have provided four speeds forward and reverse, in order to utilize relatively high rear axle gear ratios so that low motor speeds are used for the gear, thus decreasing wear and tear, increasing fuel economy, and reducing oil consumption, these desirable results being obtained with a minimum number of parts and in as simple a manner as possible, whereby the cost of production and of upkeep is lowered.

I have also found it desirable to transmit the torque from the motor to the transmission so as to minimize the shock resulting from impact on the pistons, and obtain the greatest degree of flexibility and smoothness, and to eliminate the conventional clutch. I accomplish these desirable results by transmitting the power from the engine to the transmission by means of a fluid torque transmitter of the type disclosed in Patent No. 2,179,520, issued November 14, 1939, to Isaac C. Popper for Automatic turbine drive; this construction transmits the torque by means of a coupled driving and driven rotor, and has the ability as the engine accelerates to pick up the transmission of torque efficiently, smoothly, and with extreme flexibility, without any external control mechanism and without impact or shock or wear. As the operator opens the throttle and the engine accelerates, the fluid coupling develops the necessary transmitting power and thus acts as a cushion equalizer for the entire power transmission line, no clutch or clutch pedal being required.

The specific mechanism and specific arrangement of parts designed by me to accomplish the above desirable results may now be explained in detail.

The transmission mechanism

The transmission system devised includes a fluid torque transmitter of the Popper type, housed in a casing 20, see Fig. 1, the driven rotor being connected to a transmission 21, which is automatically or manually controlled, at the will of the operator, by pressure fluid flow control mechanism housed in a casing 22.

The transmission 21 includes four forward speeds and reverse, and the preferred construction for readily shifting from one speed to another under load includes four planetary sets of the internal gear type, compounded and arranged so as to give the desirable changes in ratio. The various speeds are brought into action by selectively locking the annulus of each planetary set, and the preferred locking means includes a brake band in two adjacent sections, each section having friction lining surrounded by a full width band having an anchor pin on each half thereof, which anchor pin projects through the band and engages the two sections so as to obtain a full wrapping effect, completely balanced, when pressure is exerted on the outside of these bands.

My preferred means for applying the necessary pressure for engagement is hydraulic or fluid pressure, each brake band assembly fitting into a channel in the transmission housing, with a flexible, compressible composition ring surrounding each band and acting as a piston or seal; the operating fluid is selectively introduced into the chambers formed between the housing and the sealing ring, thus providing a sealed chamber around each ring, whereby the application of fluid pressure to this chamber compresses the sealing ring and locks the brake band to the annulus of the planet set with a cushioning effect, to bring that particular set ratio into operation. This method of control is alike for reverse, first, second, and third speeds; fourth speed, however, which is a direct drive, is brought into operation by moving a combination cone and disc clutch which locks the third speed sun gear to the transmission input shaft, the cone and disc clutch being shifted by a fluid operated piston against the pressure of relief springs to bring the clutch surfaces into engagement, whereby the entire planetary set rotates as a unit with the input shaft, and the drive is direct from the fluid torque transmitter to the output shaft.

Referring now to Fig. 2, the transmission 21 is mounted in a housing 23 separated by annular ribs forming four channel sections 24, 25, 26 and 27, each housing a planetary gear set. The motor end of the housing is closed by a face plate 28, detachably secured thereto by means of bolts 29, the face plate having a central journal 30 in which the input shaft 31 from the fluid torque transmitter rotates. The input shaft 31 is coupled to an intermediate bushing which in turn is keyed to the transmission input shaft 33. The transmission input shaft is geared to the planetary sets, as hereinafter described.

The tail end of the transmission input shaft carries a sun gear 34, which meshes with a series of planet gears 35, these planet gears being carried by a cage 36 and meshing with an annulus gear 37 positioned in the channel section 25. The annulus gear 37 is flanged to provide a laterally positioned sun gear 38, which meshes with a series of planet gears 39 carried by a cage 40, these gears 39 engaging an annulus gear 41 positioned in the channel section 24. When this annulus 41 is held stationary, by means hereinafter described, the cage 40 turns; it has an extension 42 which is keyed to the transmission output shaft 38, this shaft then turning in a reverse direction to the transmission input shaft.

To set the transmission for first speed, the annulus gear 37 is held stationary. The transmission input shaft 33 and its sun gear 34 now rotate the planet gear 35; the cage 36 is formed integral with or secured to the transmission output shaft 38, whereby the output shaft 38 turns in the same direction as the input shaft 33, and at a low speed.

Second speed is obtained when the annulus gear 44, which is positioned in the annular channel 26, is held stationary. The transmission input shaft 33 has a second sun gear 45 mounted thereon, which meshes with a series of planetary gears 46 mounted in a cage 47, which is keyed to the annulus gear 37, this annulus gear rotating the planet gears 35 to impart rotation to the cage 36 and thus to the transmission output shaft 38.

To obtain third speed, the outside shell 48 in the annular channel 27 is held stationary. The transmission input shaft 33, through its sun gear 45 and the planet gears 46 is geared to the annulus gear 44, which is keyed to cage 49. The cage 49 carries a series of planet gears 50, which mesh with a sun gear 51 on the hub 52 of the outside shell 48; since the outside shell 48 is held stationary, the planet gears 50 and their cage 49 turn, and thus turn the orbit 53, which is secured to the cage 47. The annulus gear 37, which is keyed to the cage 47, is thus caused to rotate; and the planet gears 35 turn and impart rotation to the transmission output shaft through the cage 36.

Fourth gear, or direct drive, is obtained by clutching the transmission input shaft to the shell 48 so as to prevent any relative motion of the transmission gearing. The transmission input shaft 33 is keyed to a clutch body 54 which has a conical clutch face 55 and a back clutch plate 56; the clutch body has an annular recess 57 in which spring carriers 58 are positioned, these spring carriers being mounted on an end plate 59 which encloses the clutch mechanism and is carried by the shell 48. The end plate 59 is attached to the shell 48 so as to provide an annular space 60 in which a ring piston 61 is positioned, this ring piston having a rear spring plate 62 against which compression springs 63 on the carriers 58 engage, the ring piston having a conical clutch face 64 adapted to engage the clutch body face 55 and press the clutch body into clutching contact with the disk portion 65 of the shell 48. This clutching action locks the planetary gearing to the transmission input shaft at both ends, and thus causes a direct drive of the transmission output shaft.

The brake band mechanism

The annulus gears for first, second and reverse, and the sun gear for third speed, are selectively held stationary by fluid pressure, which acts on a novel brake band construction, illustrated in Figs. 3 to 9 inclusive.

Each of these gears is grooved on its outer face 66, see Fig. 4, by forming grooves 67 thereon; two adjacent separate brake bands 68, 69 are mounted on the outer face, these bands being of metal and similar in form, but oppositely directed, the brake lining being on the inner face. Each band has a key way 70 cut adjacent one end, and full width semi-circular straps 71 and 72 are provided, having over-lapping ends, each strap having a key 73 to fit in the associated key way 70, and a lug 74 extending radially outwardly, the lugs of the two straps being laterally displaced. A flexible compressible composition sealing ring 75, made of suitable material such as molded rubber compounds, and having end flanges 76 and openings 77 to receive the lugs 74, is mounted over the straps, the brake band assemblies being seated in the annular chambers, with the lugs 74 positioned in stakes or recesses 78, see Fig. 3. In this position, the outer surface of the sealing ring when subjected to fluid pressure, as hereinafter described, presses on the straps to bind the brake bands, the two bands wrapping around the outer face of the annulus gear in opposite directions, and in perfect balance.

The fluid pressure control system

The fluid pressure control system is diagrammatically shown in Fig. 2. A fluid pump 79, actuated by the input shaft, or geared to said shaft, forces hydraulic fluid through piping 80 and a filter 81, to a control mechanism hereinafter explained. This control mechanism selectively conducts the pressure fluid to the annular chambers 24, 25, 26, 27 and to the annular clutch space 60, through conduits 82, 83, 84 and 85 in the chamber walls, and through a conduit 86 to a passageway 86a in the front plate, from whence the pressure fluid may pass through passageway 87 and a ported annular groove 88 in the end plate 59 to the annular clutch space 60.

The hydraulic fluid is preferably oil, which is also utilized as a lubricant for the transmission gearing. The necessary pressure for operating the transmission depends on the horse power to be transmitted; this pressure is controlled by a spring-pressed pressure regulator 89. When the oil pressure exceeds the required pressure for the load, it bypasses the regulator into a lubricant feed line 90 which leads to the open space around the shaft coupling and through a central shaft duct 91 and radial ports 92 to the transmission gearing. A spring pressed pressure regulator 93 is installed in the lubrication feed line 90, and controls the pressure, preferably to 10 lbs. per square inch; a bypass 94 leads excess pressure oil back to the reservoir or pump, which also receives oil drainage from the transmission, outlets 95 and 96 being provided for such drainage. The pump is supplied with oil from the sump or reservoir through piping 97, a filter or strainer 98 being positioned in the oil line.

The oil flow control mechanism

The oil flow control mechanism for controlling the gear shifting includes an automatic control and an alternative hand control. I have devised a mechanism which utilizes three valves incorporated in one unit, these comprising a master control valve which is manually rotatable for either hand or automatic control, and two slide piston valves which are alternatively movable in accordance with the control desired to selectively connect the transmission pressure fluid chamber with the pressure fluid.

I prefer to operate the automatic piston valve by a governor, and to form the valve with flow grooves which match with a spring controlled detent plunger; as the car speed increases and the governor tends to move the valve, the detent plunger yieldingly resists the valve movement until the governor pull overcomes its holding action, whereupon the shift takes place rapidly and thus prevents any lag or delay. This rapidity is particularly desirable when shifting under power, in order to prevent excessive speeding of the engine when changing from one speed to another.

The hand control piston valve is operated directly by a hand control lever, and this valve also controls neutral and reverse. The mechanism is so arranged that shifting the gear control lever to neutral or reverse automatically rotates the master control valve to the hand control position, and shifting back out of neutral to first speed or automatic forward position again rotates the master control valve to the automatic setting.

When the gear lever is in neutral all pressure is cut off from the transmission for gear operation and all the transmission fluid chambers are open to release or drainage position, thereby making it impossible for pressure to build up in any fluid pressure chamber and produce premature or accidental engagement; when any one transmission fluid pressure chamber is in communication with the pressure flow the other chambers are all open to relief or drainage. I prefer to enclose all the valve mechanism and the oil passageways within the transmission case to return any slight leakage to the oil reservoir or pump.

I further arranged to provide rapid acceleration by permitting the operator to shift to a lower gear ratio when passing other vehicles or when ascending a hill; this is accomplished by downward movement of the accelerator pedal, which brings spring pressure to bear on the lever controlled by the governor sufficient to overcome the force exerted by the governor at any car speed at which the engine is turning at less than the maximum safe speed for the next lower gear reduction. This overcoming of the governor power moves the automatic piston valve to bring the next lower gear into operation; if, however, the engine speed is above that at which it is safe to drop into the next lower speed the governor will exert sufficient power to oppose the action of the spring pressure and will prevent the shifting.

Fig. 10 schematically illustrates the flow control mechanism, which is housed in a casing 22 positioned adjacent the transmission, and includes a valve housing 100 in which the central rotatable master control valve 101 and the piston valves 102 and 103 for automatic and hand control respectively, are mounted. The control valve 101 is preferably of the solid plug type, with five spaced groove ports 104, 105, 106, 107 and 108, which continually communicate through tubes 109, 110, 111, 112 and 113 with the fourth, third, second, first and reverse transmission fluid pressure chambers.

The housing 100 has four flow channels 114, 115, 116 and 117 which respectively communicate with the control valve ports 104, 105, 106 and 107 and which are selectively opened to pressure fluid by movement of the automatic piston valve 102, and also has five flow channels 118, 119, 120, 121, and 122 which are selectively opened to pressure fluid by movement of the hand control piston valve 103, the channels 121 and 122 and the ports 107 and 108 being spaced to provide a neutral cut-off 123.

The pressure fluid from the pump 79 passes through piping 80 into a longitudinal inlet flow channel 124 which communicates with both valves 102 and 103. The valves are of similar construction, valve 103 being longer, and are of the hollow cylinder type, the valves being provided with a vertical inflow recess 125, 125a which lead to annular inlet grooves 126, 126a near the base of the valve and to vertical balancing recesses 127, 127a diametrically opposite the recess 125, 125a.

When the master control valve is in the position illustrated in Fig. 10, the transmission is automatically controlled; the pressure fluid passes through the recess 125 of the valve 102 and through the inlet groove 126 into channel 17 and through port 107 to the tube 112 which leads to the first speed pressure fluid channel 25. If this valve 102 is moved upwardly it will successively bring the recess 126 into communication with channels 116, 115 and 114 which lead to the second, third and fourth speed transmission pressure fluid channels.

As the valve moves, the transmission pressure fluid channels which do not receive pressure fluid drain into the oil reservoir or pump, this drainage for first speed being below the base of the valve 102, and the drainage for the other speeds being through a vertical slot 128 extending through the wall of the valve.

The movement of the valve 102 is preferably automatically controlled by means of a ball-type governor 129 which is driven from the tail shaft, outward movement of the weighted levers 130 shifting a cage 131 upwardly against the pressure of a spring 132, the cage carrying a vertical rod 133 which is hinged to a lever 134, one end of the lever being pivotally mounted on the accelerator cross rod 135, the other end of the lever being hingedly secured to a slit valve rod 136 secured to the valve 102. The valve 102 is preferably provided with a series of vertically spaced detent recesses which are engaged by a spring pressed plunger 138, whereby the valve 102 will not move in response to the governor action until the governor power is sufficient to overcome the spring pressed plunger resistance, thus providing a rapid valve change, and proper inlet groove and channel alignment.

The lever 134 has a spring socket 139 adjacent the pivot end in which a suitable spring 140 engages, a member 141 keyed to the accelerator shaft 135 extending outwardly to mount the spring 140, whereby downward pressure of the accelerator as hereinafter described will press on the lever 134 through the spring 140 to overcome the governor power when it is desired to accelerate in order to pass other vehicles or to climb a hill. The strength of the spring 140 is designed to cooperate with the governor to permit shifting to a lower gear ratio at any car speed at which the engine is turning at less than the maximum safe speed for the next lower gear reduction, and not to move the valve when the engine speed is above that at which it is safe to drop into the next lower speed.

The hand control piston valve 103 is of the same type as valve 102, but is longer, to permit bringing its annular inlet groove 126a to the neutral cut-off 123; the reverse channel 122 is positioned so as to normally drain below the valve, the other channels 118 to 121 draining through a vertical slot 128a. The valve 103 is manually operated, as hereinafter explained, and has a series of vertical detents and a cooperating spring pressed plunger 138a to ensure snap movement and proper alignment of the inlet groove and its cooperating channels.

The control valve housing has a series of passageways, and porting is preferably made by forming the housing in multiple sections and brazing together, whereby the machining is facilitated and the valves can be produced more accurately and at a lower cost.

A gear lever 142 is pivotally mounted on the steering wheel within easy reach of the operator, and has a movable rod 143 mounted therein and terminating in an end finger 144 which may be moved in a stationary lever guide 145 to selectively position the end finger in an upper slot 146 for hand control, or a lower slot 147 for automatic control. The two slots communicate through end passages 148, 149 and the upper slot has spaced notch detents 150 for each forward speed, a notch detent 151 for neutral, and a slot 152 for reverse. The communicating end passages permit the driver to change at will from hand to automatic control, but require movement to neutral before reversing.

When the lever 142 is shifted to the upper slot, as shown in Fig. 17, its end 153 moves a spring pressed control rod 154 which is slidably mounted in a tubular shaft 155, to shift the master valve to hand operation position, through a lever system which may be of any desired type; the lever system illustrated includes a crank 156, link 157, crank 158, shaft 159, crank 160, link 161, and crank 162 which is secured to the valve rod 163 of the master control valve 101. When the gear lever 142 is in the lower slot, the master control valve is turned to automatic operating position, by the same lever system.

With the gear lever 142 in the upper slot, the gear lever 142 may be swung to position the end finger in any of the detent notches, and thus shift the hand control valve to the proper fluid transmission control by means of a lever system of any desired type, a preferred system including a housing 164 which is rotatably mounted in a steering wheel extension bearing ring 165 and is keyed to the tubular shaft 155, this tubular shaft operating an arcuate lever 167, link 168, crank 169, tubular shaft 170, crank 171, link 172, crank 173, shaft 174, and lever 175 which is secured to the valve end 176 of the hand control valve 103.

The accelerator pedal 177, of standard type, is operatively secured to the arm 141, which acts as a pick up lever to counteract the governor action and thus permit the obtaining of a lower speed as hereinbefore described. Any system of levers or other control means may be used; the illustrated lever system includes a link 178, crank 179, shaft 180, crank 181, link 182, crank 183, intermediate shaft 184, crank 185, link 186, and crank 187 which is keyed to the accelerator cross rod 135.

The slidable rod 143 is actuated by a manually depressible button 187a which is seated in a cylindrical recess 188 in the ball end 189 of the gear lever, the recess having a lower bore 190 to threadedly receive a gear member 191 in which two small gears 192 are rotatably mounted, these gears meshing with internal grooves 193 in the button and with grooves 194 formed in the upper end of the slidable rod, a compression spring 195 being positioned to resiliently urge the button away from the gear member 191. When the button is pushed down, the gears 192 turn and move the slidable rod upwardly against the tension of the spring 195, thus withdrawing the end finger from a notch and permitting turning of the gear lever. No notches are provided for the automatic control.

*The fluid torque transmitter construction*

The transmitter is housed in the casing 20, see Fig. 1 and includes a driving rotor 200, see Fig. 21, which is secured to the flywheel 201 and the power shaft 202, the driven rotor 203 being slidably keyed to the transmission input shaft 31. The transmitter fluid is conducted from a fluid pressure reservoir, not shown, to an annular chamber 204 formed between the shaft 31 and a stationary shell 205, the shell having a tubular end 206 spaced from the shaft 31 to provide an annular passageway to the rotor fluid chamber 207. Novel sealing rings are provided between the shell and the driving rotor and shaft, these rings including flat plates 208 and 208a which are respectively keyed to the shell and to the shaft, each plate having two spiral grooves 209, followers 210 and 210a of flexible material which have a series of concentric grooves 211, each follower being resiliently pressed towards its plate by means of a coil spring 212 which is positioned between the follower and a spring plate 213.

While I have described specific structural details of a preferred arrangement of parts for carrying out my invention, such description is illustrative only, and any desired changes in the operation, arrangement and functioning of the parts, and in their sizes and proportions, may be made to suit the requirements for different automobile vehicle designs, without departing from the spirit and the scope of the invention as defined in the appended claims.

I claim:

1. In a flow control mechanism, a source of fluid under pressure, conduits for conducting said fluid to a plurality of fluid pressure chambers, two valves each independently alternatively controlling the fluid flow from said source through said conduits, and means for selectively rendering either valve inoperative.

2. In a flow control mechanism, a supply conduit for fluid under pressure, a control valve selectively communicating said conduit with a series of flow passages, a second control valve for selectively communicating said conduit with a series of flow passages, a series of outflow channels, and means for alternatively communicating either series of flow passages with said series of outflow channels.

3. In a fluid flow control mechanism, a fluid inflow conduit, two series of flow chambers, two piston valves for selectively communicating said inlet conduit with the flow channels of each series, a series of outflow conduits, and a master valve for alternatively connecting either series of flow channels with said series of outflow conduits.

4. In a fluid flow control mechanism, a fluid inflow conduit, two series of flow channels arranged in spaced aligned relation, two piston valves for selectively communicating said inlet conduit with the flow channels of each series, a series of outflow conduits contiguous the space between said two series, and a master valve for alternatively connecting either series of flow channels with said series of outflow conduits.

5. In a fluid flow control mechanism for an automobile transmission, a pressure fluid supply conduit, a series of outflow conduits, a governor responsive to speed of the automobile motor, a valve movable to selectively connect said supply conduit with said outflow conduits, means for moving said valve in response to movement of said governor, a second valve manually movable to selectively connect said supply conduit with said outflow conduits, and means for alternatively rendering one valve operative and the other inoperative.

6. In a fluid flow control mechanism for an automobile transmission, a pressure fluid supply conduit, a series of outflow conduits, a governor responsive to speed of the automobile motor, a valve movable to selectively connect said supply conduit with said outflow conduits, means for moving said valve in response to movement of said governor, a second valve manually movable to selectively connect said supply conduits with said outflow conduits, and manually movable gear lever means for alternatively rendering one valve operative and the other inoperative.

7. A fluid control valve construction comprising a cylindrical shell piston valve, a longitudinal recess for fluid flow, an annular flow groove communicating therewith, and a second longitudinal recess communicating with said groove and positioned diametrically opposite said first recess.

8. A fluid control valve construction comprising a cylindrical shell piston valve, a longitudinal recess for fluid flow, an annular flow groove communicating therewith, and a second longitudinal recess communicating with said groove and positioned diametrically opposite said first recess, said valve having a longitudinal flow slot.

LE ROY F. MAURER.